United States Patent [19]

Cameron

[11] 4,451,736

[45] May 29, 1984

[54] METHOD AND APPARATUS FOR MEASURING AIR ION CONCENTRATIONS

[75] Inventor: John R. Cameron, Madison, Wis.

[73] Assignee: Wisconsin Alumni Research Foundation, Madison, Wis.

[21] Appl. No.: 369,006

[22] Filed: Apr. 16, 1982

[51] Int. Cl.³ .............................................. G01T 1/18
[52] U.S. Cl. .................................. 250/376; 250/336.1
[58] Field of Search ............... 250/376, 377, 378, 389, 250/336.1

[56] References Cited

U.S. PATENT DOCUMENTS

| | | |
|---|---|---|
| 2,601,637 | 6/1952 | Rose et al. |
| 2,639,389 | 5/1953 | Landsverk |
| 2,695,363 | 11/1954 | Marvin |
| 2,748,291 | 5/1956 | Warmoltz |
| 2,875,343 | 2/1959 | Birkhoff et al. |
| 2,916,626 | 12/1959 | Thomas et al. |
| 3,924,324 | 12/1975 | Kodera .................................. 29/592 |
| 4,227,086 | 10/1980 | Dreyfus et al. ...................... 250/389 |

OTHER PUBLICATIONS

Cameron et al., "A Cylindrical Electret Ionization Chamber."
Cameron et al., "A Cylindrical Electret Ionization Chamber," Abstract of Paper presented at 6th Intern. Conf. on Solid State Dosimetry, Toulouse, France, Apr. 1-4, 1980.
Product Description, DEV Industries, Inc. "Ion Counter and Mobility Discriminator Model," Beckett, Serial No. 566.

Primary Examiner—Janice A. Howell
Attorney, Agent, or Firm—Isaksen, Lathrop, Esch, Hart & Clark

[57] ABSTRACT

An air ion dosimeter is disclosed which includes a small electret (10) charged to a selected level and then enclosed to await use. Measurement of air ions is made by removing the enclosure (12) from the electret (10), and either exposing the electret to the ambient atmosphere for a specific time period or drawing a specific volume of air past it. After the exposure has been made the enclosure (12) is replaced on the electret (10). The charge remaining on the electret is measured at a convenient later time. The difference between the initial charge on the electret and the charge remaining after exposure is proportional to the relative air ion concentration at the location at which the electret was exposed.

14 Claims, 5 Drawing Figures

METHOD AND APPARATUS FOR MEASURING AIR ION CONCENTRATIONS

TECHNICAL FIELD

This invention relates generally to equipment and techniques for detecting the presence of ions in a gas such as air and, more particularly, to measuring the relative concentration of such ions in a volume of air.

BACKGROUND ART

It has long been known that the earth's atmosphere contains ions—positively and negatively charged particles—in varying concentrations. Such ions are produced naturally by lightning discharges, background radiation of various types including high energy ultraviolet light and air borne radon and its radioactive daughter products, and the friction effects of wind, rain, snow and hail. There are also many man-made sources of air ions, such as negative air ion generators, air flowing over metal surfaces as in heat ducts, and high voltage direct current transmission lines. But air ions can also be generated in unexpected ways—such as by the friction of air over the surface of an airplane, which charges the outer surface positively and attracts negative ions away from the interior of the airplane cabin, leaving an excess of positive ions. High voltage, direct current transmission lines can also be a significant source of localized concentrations of air ions.

A number of studies have been performed to try to determine the physiological effect of air ions on individuals. It appears that some portion of the population is sensitive to ion imbalances, particularly an excess of positive ions over negative ions. This sensitivity may be manifested in a loss of mental alertness, mood changes, headaches, sluggishness and other forms of discomfort. There is also evidence that an environment with a deficient number of negative air ions, even where the positive and negative ion concentrations are balanced, can have an effect on sensitive individuals.

A difficulty encountered in determining the significance of potential sources of air ions, as well as correlating the sources with the effects on local populations, is that present techniques for measuring relative ion concentrations are complicated and time consuming.

A common technique for measuring air ion densities utilizes an air aspirator which provides a steady flow of air through a cylindrical or rectangular intake to two or more spaced electrodes. One electrode or set of electrodes is charged to a positive or negative potential while the second or collector electrode is connected to ground through a sensitive femtoammeter. Ions which are of the same potential as the charged electrode are driven to the collector electrode and the current is measured. If steady gas flow and singly charged ions are assumed, the collector electrode current can then be converted to an equivalent air ion density.

Difficulties have been noted with the use of such an aspirator system when used in field locations rather than in the laboratory. The read-out display from the instrument may be difficult to interpret because the instrument responds to the instantaneous density of ions on the collector electrode, which fluctuates over time. To facilitate the interpretation of data from the instrument, it is necessary to have a chart recorder, or memory circuitry, which averages the instantaneous data over successive, short time periods.

Another difficulty observed with the aspirator system is the perturbation produced in the local electric field resulting in a deterioration of the accuracy of the data collected. The instrument's metal case alters the local electric field lines so that the field lines intersect the case at right angles. The small air ions may be so light that they may follow the field lines and recombine on the instrument case before reaching the collector electrode. Because of these losses at the inlet structure of the aspirator, the number of ions detected will be less than the actual number of ions concentrated in the air drawn through the device. Such difficulties caused by local electric field interference may be particularly significant in the high electric fields adjacent to high voltage DC transmission lines.

DISCLOSURE OF THE INVENTION

In accordance with the invention, a portable air ion dosimeter is provided which utilizes a central electret having an initial charge, which is surrounded and protected by an air tight enclosure. The electret retains its charge for a long period of time within the enclosure so that the dosimeter can be stored or transported to the point of use. The dosimeter can be made light and small, similar in bulk to a pen, to facilitate its portability and ease of use.

At the location where ion measurements are to be taken, the concentration of air ions may be determined by simply removing the enclosure surrounding the electret and exposing the electret to the ambient atmosphere for a preselected period of time, during which air ions having a charge opposite to that of the electret will be attracted thereto and will tend to neutralize the surface charge of the electret. After the preselected period of exposure, the enclosure is replaced on the electret to prevent further accumulations of ions. Alternatively, the electret may be removed from the enclosure and placed in a stream of air moving past the electret at a known volumetric flow rate for a selected period of time. In this manner, the volume of air to which the electret is exposed may be calculated to more precisely determine the concentration of ions per unit volume in the atmosphere. Again, after exposure of the electret and accumulation of oppositely charged ions thereon, the enclosure is replaced to stop further accumulation of ions. Because of the stability of the charge on the electret, the exposed electret may be transported to a laboratory and tested at a more convenient time to determine the concentration of ions collected.

To determine the quantity of air ions collected during a sampling, the charge on the electret is measured initially before being covered by the enclosure, and is then measured again back in the laboratory to determine the charge after exposure. The difference in charge before and after exposure is proportional to the quantity of air ions collected. The electret can be charged either positively or negatively to measure air ion concentrations of either polarity.

The preferred construction for the electret is a cylinder of polytetrafluoroethylene, which may be charged by exposing it to a corona discharge as produced by a plurality of pointed wires disposed about the periphery of the outer surface of the electret cylinder. The charging of the electret may be facilitated by incorporating a central conductive core in the electret, with the core being grounded during charging. Retention of the charge on the electret may be enhanced by exposing the charged surface of the electret to heat in an annealing process.

The charge on an electret can easily be measured by inserting the electret into a hollow conducting cylinder attached to the input of a charge reading instrument such as an electrometer.

Using a cylindrical electret to accumulate air ions also allows for a determination of the relative mobilities of the ions being collected. Where the electret is mounted parallel to the direction of movement of the moving stream of air, the lighter, high mobility ions will be deposited at the forward end of the electret while air ions of lower mobility will be deposited further along the length of the electret. The distribution of the charge on the electret can be easily determined as the electret is being inserted into the conducting cylinder attached to the electrometer.

Further objects, features and advantages of the invention will be apparent from the following detailed description taken in conjunction with the accompanying drawings.

BEST MODE FOR CARRYING OUT THE INVENTION

Figure 1:
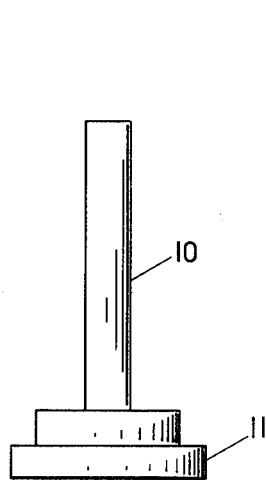
FIG. 1 is an elevation view of the electret portion of the air ion dosimeter mounted on a base.
Figure 2:
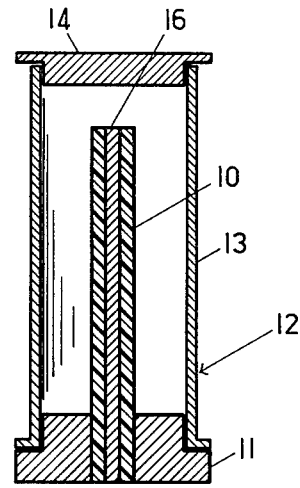
FIG. 2 is a cross-sectional view through the center of the air ion dosimeter of the invention.

With reference to the drawings, a preferred embodiment of an electret for use in accumulating air ions is shown generally in FIG. 1 at 10 mounted on a metal base 11. The electret is a generally cylindrical dielectric rod affixed to the center of the circular base 11 which is adapted for holding in the hand of a user. As best shown in FIG. 2, which is a cross-section through the assembled dosimeter of the invention, the electret 10 may run completely through a central bore in the base and be thus held therein. When the dosimeter is in the assembled relation of FIG. 2, the clean electret 10 is covered by an enclosure 12 consisting of a cylindrical side wall 13 and an end cap 14 mounted thereto, as by screw threads (not shown). The enclosure side wall 13 may conveniently be held to the base by screw threads, not shown for simplicity, or any other suitable locking device. When the enclosure 12 is in place, the electret 10 is exposed only to ions within the enclosure, relatively few in number, so that the charge initially placed on the electret does not substantially decrease over time. There may be some additional ionization of the air within the enclosure caused by the effects of background ionizing radiation passing through the enclosure, although such radiation ionization will be of relatively small magnitude. As explained below, the electret 10 preferably has a hollow bore formed therein which is filled with a central conductive core 16, e.g. aluminum, running the length of the electret.

Although a cylindrical electret is preferred in producing a dosimeter in accordance with the present invention, other structures for electrets are, of course, known and may be utilized in accordance with the method for measuring air ions described further below. The particular cylindrical geometry of the electret 10 has been found highly suited to accurate and convenient measurement of air ions in a relatively compact and economical structure. In particular, the cylindrical electret 10 may be formed of polytetrafluoroethylene, such as is sold under the trademark Teflon, which readily accepts and retains a surface charge, either positive or negative, placed on the outer surface thereof. Such a structure can be made in very convenient sizes, e.g., 5 mm. in diameter by approximately 4 cm. long, with the conducting metal enclosure 12 being about 2 cm. in diameter and about 5 cm. long. The electret material should, of course, be cleaned before using as an electret to improve charge stability.

Figure 3:
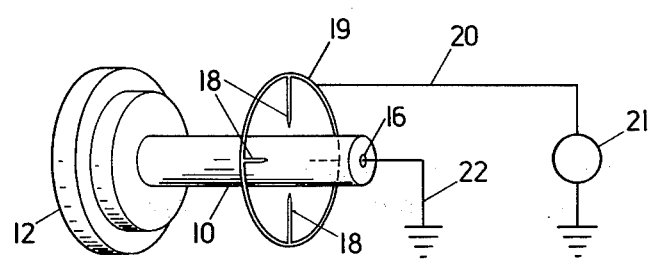
FIG. 3 is a perspective view of the electret of FIG. 1, with apparatus for charging the electret illustrated schematically.

A technique for charging the electret is shown in somewhat simplified schematic form in FIG. 3. The electret is inserted between corona generating points or needles 18 which are spaced about the periphery of the electret and mounted on a ring 19. The ring 19 is electrically connected through a wire 20 to a high voltage generator 21, which may typically provide a voltage in the range of 2 to 4 kilovolts, positive or negative, as desired. Such a generator is easily constructed, and may be made portable by utilizing a lower voltage battery connected to a DC to DC converter which provides the higher voltages required. The arrangement of needles 18 mounted on the ring 19 is illustrative only, and other constructions are possible, such as Bekinox stainless steel wires having many fine tips which produce the corona discharge. The corona charger may be made by laying several of such wires lengthwise inside a plastic tube with the fine points directed toward the center of the tube. The electret has the corona discharge applied to it for a few seconds and will typically acquire a charge of about 4 to 5 nanocoulombs ($10^{-9}$ coulomb). The charge stability of the electret may be improved by annealing the charged electret at a moderate temperature; for example, the electret may be heated to about 140° C. for about 10 minutes, which will result in an electret having a typical charge loss of less than 1% a month.

The efficiency of the application of the corona discharge to the surface of the electret 10 may be improved by grounding the center metal core 16 with a wire 22.

Figure 4:
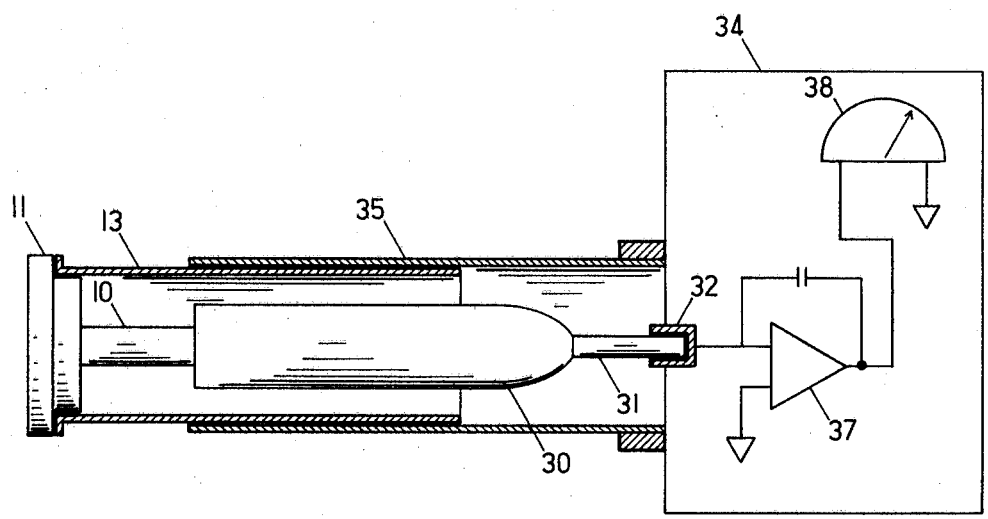
FIG. 4 is a partial cross-sectional view showing the electret being inserted into the measuring cylinder of a charge measuring device.

After the electret has been exposed to collect a sample of ions, its charge can be measured as illustrated in FIG. 4. The cap 14 is removed from the cylindrical wall 13 and the electret 10 inserted lengthwise into the open end of a conductive cylinder 30 which has a diameter slightly greater than that of the electret. The conducting cylinder 30 is mounted at its end to a rod 31 which makes an electrical connection with the input port 32 of an electrometer 34. The conducting cylinder 30 is conveniently maintained in proper alignment with the electret 10 by utilizing a cylindrical sheath 35, concentric with the cylinder 30, which has an inside diameter slightly greater than the outside diameter of the dosimeter wall 13. As shown in FIG. 4, by sliding the dosimeter wall 13 into the bore of the sheath 35, the electret 10 will be properly aligned in the middle of the conducting cylinder 30. The electrical potential of the cylinder 30 will be proportional to the charge on the electret. Any suitable charge reading device may be used as the electrometer 34, which is illustratively shown in FIG. 4 as having an isolating input amplifier 37 which receives the signal proportional to charge at the input 32 and drives a read-out 38.

The air ion dosimeter may be conveniently used to obtain relative ion concentration readings at various remote locations. Because of the small size and light weight of the dosimeter, it can easily be carried by personnel to a field location where the sampling of air ions is to take place, and, moreover, it is possible for a single individual to carry several of the dosimeters so that multiple samples can be taken, at various locations, and at various times.

In measuring relative concentrations of air ions, the electret 10 is first charged up in the manner illustrated in FIG. 3; the cylindrical enclosure wall 13 is then attached to the base 11, and the electret is inserted into the measuring cylinder 30 to allow measurement of the initial charge on the electret. The initial charge reading is recorded and the cap 14 is mounted in place to completely cover the fully charged electret and prevent discharge of the electret from contact with ambient ions except in the small space within the enclosure 12. Of course, the charge on the electret may be stabilized after charging by the annealing process described above.

The fully charged and enclosed electret may be kept for several days or even weeks before being used because of the very high charge stability of the electret. At the location where the sample is to be taken, the user simply unscrews the cylindrical wall 13 from the base 11 and exposes the electret to the ambient atmosphere for a prechosen period of time, generally in the range of 5 to 10 minutes. During this period of time many of the ambient air ions will be drawn to the surface of the electret 10 and, in accumulating there, will reduce the effective charge on the electret. Although the volume of air to which the electret is exposed by using it in this manner will be variable, the quantity of ions collected will provide a general measure of the relative concentration of ions in the vicinity of the electret. When the electret has been exposed for the chosen time period, the user replaces the cylindrical wall 13 on the base 11, thereby sealing the exposed electret from the atmosphere and preventing further accumulation of ions on the electret. The exposed electret retains a stable charge when it is once again closed off from the atmosphere for a substantial period of time, allowing convenient transportation of the electrets back to a central laboratory where they can be measured. At the laboratory, the cap 14 is again removed from the cylindrical side wall 13 and the electret inserted into the the conducting cylinder 30 of the reading device to determine the charge seen on the electret after exposure. The oppositely charged ions which have collected on the electret will neutralize a commensurate portion of the initial charge on the electret, so that the difference between the charge readings obtained from the electrometer 34 before and after exposure will be proportional to the number of ions that have been collected.

Figure 5:
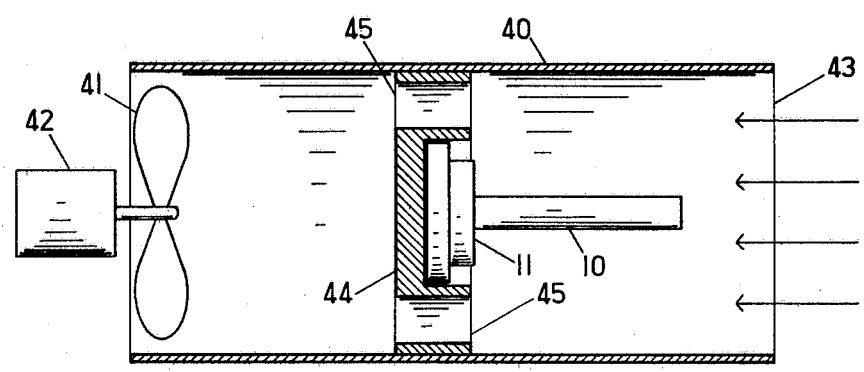
FIG. 5 is a simplified cross-sectional view showing the exposed electret mounted in a conduit through which a known volume of air is drawn.

To obtain a more precise measurement of the volumetric concentration of ions, the electret may be exposed to a flow of air moving at a selected rate for a selected period of time so that the volume of air to which the electret has been exposed can be calculated. A schematic example of a device for allowing the use of the electret 10 for sampling in this manner is shown in FIG. 5. The device includes a conduit 40, which has been shown as a cylinder in FIG. 5 for illustration; other configurations such as rectangular conduits can also be used. Air is drawn through the conduit by a fan 41 driven by a motor 42 so that a preselected flow rate into the conduit from the input side 43 is obtained. The electret is charged and the initial charge reading of the electret 10 is obtained in the same manner as described above, and the electret is sealed within the enclosure defined by the wall 13 and cap 14 in the same manner as described above until the time of use. When ready for use, the enclosure is removed from the electret and the electret 10 and its base 11 are placed on a mount 44 within the conduit 40 having channels 45 therein to allow passage of air. The fan motor 42 is then turned on for a predetermined period of time. After the time has elapsed, the motor is turned off, the electret 10 is removed from the conduit by the user and the enclosure replaced so that further accumulation of ions is stopped. The charge reading on the electret after the sample has been taken may again be made at a later time at the laboratory as described above. Because the cross-sectional area of the conduit 40 and the flow rate induced by the fan 41 are known, the volume of air to which the electret has been exposed can be calculated and the air ion concentration can then be determined by dividing this volume into the number of ions accumulated by the electret as determined by the readings on the electrometer 34 before and after exposure.

The lighter, high mobility ions will tend to concentrate at the forward or top end of the electret while the heavier ions will tend to be deposited toward the end of the electret nearer the base 11. The electret may be inserted into the measuring cylinder 30 in incremental steps to allow the charge readings to be correlated with position on the electret.

It is understood that the invention is not confined to the particular construction and arrangement of parts herein illustrated and described, but embraces such modified forms thereof as come within the scope of the following claims.

What is claimed is:

1. A method of determining the relative concentration of ions in air, comprising the steps of:
    (a) providing an electret formed of a dielectric material which can carry charge;
    (b) charging the electret to a selected charge level;
    (c) covering the charged electret with an enclosure so that the electret is shielded from ambient atmosphere;
    (d) exposing the electret to ambient atmosphere for a selected period of time by removing the enclosure, and thereafter covering the electret with the enclosure again;
    (e) removing the enclosure, and, immediately thereafter,
    (f) measuring the charge remaining on the electret, the difference between the initial charge and the measured charge being related to the quantity of ions collected by the electret during exposure.

2. A method of determining the concentration of ions in air, comprising the steps of:
    (a) providing an electret formed of a dielectric material which can carry charge;
    (b) charging the electret to a selected charge level;
    (c) covering the charged electret with an enclosure so that the electret is shielded from ambient atmosphere;
    (d) removing the enclosure;

(e) exposing the electret to a stream of air moving at a chosen volume rate past the electret for a chosen period of time, and thereafter covering the electret with the enclosure again;

(f) removing the enclosure; and, immediately thereafter, (g) measuring the charge remaining on the electret, the difference between the initial charge on the electret and the measured charge being proportional to the quantity of ions collected by the electret while it was exposed to the moving stream of air.

3. The method of claim 2 wherein the step of exposing the electret to a stream of air comprises mounting the electret in a conduit of a selected cross-sectional area having a fan mounted to draw air through the conduit and past the electret at a chosen flow rate.

4. the method of claim 1 or 2 including, after the step of charging the electret and before the step of covering the electret, the additional step of measuring the initial charge on the electret.

5. The method of claim 1 or 2 wherein the step of charging the electret comprises inserting the electret into the corona spray of a corona discharge device for a selected period of time.

6. The method of claim 1 or 2 wherein the electret is cylindrical and is formed of polytetrafluoroethylene.

7. The method of claim 6 wherein the electret has a cylindrical interior bore with a conductive core inserted therein.

8. The method of claim 7 wherein, during the step of charging the electret, the metal rod is connected to ground potential to facilitate the deposition of charge on the external surface of the electret.

9. The method of claim 1 or 2 wherein the electret is formed of polytetrafluoroethylene and, after the step of charging the electret and before the step of covering the electret, the additional step of heating the electret for a period of time to anneal the surface of the electret and stabilize the charge thereon.

10. The method of claim 1 or 2 wherein the step of covering the charged electret with an enclosure comprises covering the electret with an enclosure formed of a cylindrical metal wall and an end cap fitting over and sealing to the top of the cylindrical metal wall.

11. The method of claim 1 or 2 wherein the step of measuring the charge of the electret comprises inserting the electret into a conducting cylinder closely spaced from the electret and detecting the electric potential of the conducting cylinder.

12. The method of claim 1 or 2 wherein the electret is cylindrical and is formed of polytetrafluoroethyelene, and wherein the step of charging the electret comprises inserting the electret into the corona discharge from a plurality of radially spaced, pointed wires maintained at a high voltage.

13. The method of claim 12 wherein the pointed wires are maintained at a voltage in the range of 2 to 4 kilovolts for a period of time sufficient to provide a charge on the electret of several nanocoulombs.

14. An air ion dosimeter comprising:
 (a) an electret formed of polytetrafluoroethylene and having a cylindrical outer surface and a hollow interior bore with an electrically conductive core mounted therein;
 (b) a circular base to which the electret is mounted;
 (c) a removable enclosure for the electret electrically isolated from the conductive core within the electret including a cylindrical side wall adapted to surround the electret and mount to the base and a cap mounted to the end of the cylindrical wall to close the open end thereof.

* * * * *